US006965638B2

(12) United States Patent
Warke

(10) Patent No.: US 6,965,638 B2
(45) Date of Patent: Nov. 15, 2005

(54) INCREASING PERFORMANCE IN MODEMS IN PRESENCE OF NOISE

(75) Inventor: Nirmal Warke, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 814 days.

(21) Appl. No.: 09/953,040

(22) Filed: Sep. 12, 2001

(65) Prior Publication Data

US 2002/0150154 A1 Oct. 17, 2002

Related U.S. Application Data

(60) Provisional application No. 60/284,661, filed on Apr. 17, 2001.

(51) Int. Cl.[7] ............................ H04B 1/38; H04L 5/16
(52) U.S. Cl. ...................................................... 375/222
(58) Field of Search ......................................... 375/222

(56) References Cited

U.S. PATENT DOCUMENTS

| | | | | |
|---|---|---|---|---|
| 4,606,044 | A * | 8/1986 | Kudo | 379/22.02 |
| 4,621,366 | A * | 11/1986 | Cain et al. | 375/222 |
| 5,887,027 | A * | 3/1999 | Cohen et al. | 375/222 |
| 6,317,495 | B1 * | 11/2001 | Gaikwad et al. | 379/417 |
| 6,320,901 | B1 * | 11/2001 | Arad et al. | 375/222 |
| 6,563,864 | B1 * | 5/2003 | Ibrahim et al. | 375/222 |
| 6,647,058 | B1 * | 11/2003 | Bremer et al. | 375/222 |
| 2001/0036237 | A1 * | 11/2001 | Storm et al. | 375/350 |
| 2003/0081741 | A1 * | 5/2003 | Anne et al. | 379/93.01 |
| 2004/0096044 | A1 * | 5/2004 | Olafsson et al. | 379/93.32 |

OTHER PUBLICATIONS

Channel Capacity and Co-Channel Interference. 1998. University of Southampton.□□http://www-mobile.ecs.soton.ac.uk/peter/publications/loughborough96/node1.html.*

Chavillat et al. 1987. IEEE. Rapid Training of a Voiceband Data-Modem Receiver Employing an Equalizer with Fractional-T Spaced Coefficients. pp. 8969-876.*

Wikipedia, Noise Floor□□http://en.wikipedia.org/wiki/Noise_floor.*

Naofal Al-Dhahir and John M. Cioffi "Optimum Finite-Length Equalization for Multicarrier Tranceivers" IEEE Transactions on Communications, vol. 44, No. 1, Jan. 1996, pp. 56-64.

Behrouz Farhang-Bouroujeny and Ming Ding, "Design Methods for Time-Domain Equalizers in DMT Transceivers", IEEE Transactions on Communications, vol. 49, No. 3, Mar. 2001, pp. 554-562.

Asymmetrical Digital Subcriber Line (ADSL) Transceivers ITU-T Telecommunication Standardizations Sector of ITU, Proposed Draft ITU-T Recommendation G.992.1, pp. 118-119.

* cited by examiner

*Primary Examiner*—Kevin Burd
*Assistant Examiner*—Juan Alberto Torres
(74) *Attorney, Agent, or Firm*—J. Dennis Moore; W. James Brady, III; Frederick J. Telecky, Jr.

(57) ABSTRACT

A digital communications system with a built-in apparatus for improving receive path performance in the presence of noise. An analog datastream is provided to a hardware receive filter that rejects signals lying outside a frequency spectrum of interest, while a hardware equalizer flattens the channel response. An analog-to-digital converter digitizes the filtered and equalized analog datastream into a digital bitstream, which is then filtered, further channel-equalized and demodulated. The system also includes a memory, an estimator unit, having a first input coupled to the memory and a second input coupled to a data input, and an output coupled to a compute unit. The estimator unit is adapted to providing estimates of signal power, channel noise and channel response. The compute unit, has an input coupled the estimator unit and an output coupled to the memory, and is adapted to computing a channel capacity based the selected combination of modem parameters.

6 Claims, 3 Drawing Sheets

INCREASING PERFORMANCE IN MODEMS IN PRESENCE OF NOISE

This application claims priority to the provisional application entitled "Improved Performance for ADSL Modems in Presence of Crosstalk Noise", Ser. No. 60/284,661, filed Apr. 17, 2001, which is incorporated herein by reference.

TECHNICAL FIELD

This invention relates generally to digital communications, and particularly to techniques for improving modem performance in the presence of interference.

BACKGROUND

Modern high data-rate modems perform a significant amount of signal processing in order to maximize utilization of available bandwidth. The signal processing may be performed on analog signals or digital signals or more typically, on both analog and digital signals. Filtering and channel equalization are the two most commonly used signal processing operations performed on data in every modem.

Filtering is used to separate the desired signal from other signals, such as noise and other forms of interference may be performed via low-pass filters, high-pass filters or band-pass filters, depending on the location of the desired signal with respect to the noise and interference. Analog filters are made from actual capacitors and resistors, for example. Digital filters, on the other hand, are software filters written like programs and specified by their filter coefficients. Digital filters execute like programs on a dedicated digital signal processor (DSP), a general purpose DSP, or a general purpose microprocessor or may be implemented as firmware on a custom designed piece of hardware.

Channel equalization is performed by channel equalizers and can be done in either the analog or digital domains. Channel equalizers attempt to flatten out a channel's frequency response. Because a channel's frequency response tends to rapidly attenuate as the frequency increases, channel equalizers compensate for the frequency response attenuation by imparting an increasing amount of gain corresponding to the increasing frequency. Analog channel equalizers are created from amplifiers, capacitors and resistors, for example. Digital channel equalizers are created in software and like digital filters may be programs executing on a dedicated DSP, a general purpose DSP, or a general purpose microprocessor or be implemented in firmware on a custom designed piece of hardware.

Each filter and channel equalizer has a distinct set of parameters which specifies their behavior. For example, a filter may be specified by its type (low-pass, band-pass, or high-pass), order (how rapid the transition is from the pass-band to the stop-band) and corner frequency (the frequency where the pass-band begins to transition to the stop-band). A channel equalizer may be specified by the slope of its frequency response. The channel equalizer's frequency response is typically the inverse of the frequency response of the channel that the channel equalizer is attempting to equalize.

Traditionally, the parameters for each filter and channel equalizer in a modem are set independently of one another. Normally, the modem, either through information provided to it or via some measurements it made on its own, will set the parameters based on channel characteristics. However, by setting the various parameters independently, no regard is given to how the filters and channel equalizers interact. For example, a receive filter set to operate as a high-pass filter to provide some echo rejection also affects the overall channel response which in turn affects the performance of the channel equalizer. A hardware equalizer increases the dynamic range for a high frequency signal and also provides some echo rejection, but it also affects the overall channel response and hence the performance of an adaptive channel equalizer.

Techniques that set parameters for the filters and channel equalizers without regard for the impact of the filters and channel equalizers on the channel characteristics may lead to a lower overall performance level. A need has therefore arisen for a technique that sets the parameters of the filters and channel equalizers with consideration of the impact on the channel characteristics due to these individual components.

SUMMARY OF THE INVENTION

In one aspect, a preferred embodiment of the present invention provides a method for increasing modem performance in the presence of noise comprising, selecting a combination of modem parameters and determining channel capacity based on said combination of modem parameters. The previous steps repeated for other combinations of modem parameters, and selecting a specific combination of modem parameters providing a highest channel capacity.

BRIEF DESCRIPTION OF THE DRAWINGS

The above features of the present invention will be more clearly understood from consideration of the following descriptions in connection with accompanying drawings in which.

DETAILED DESCRIPTION OF ILLUSTRATIVE EMBODIMENTS

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

Figure 1:
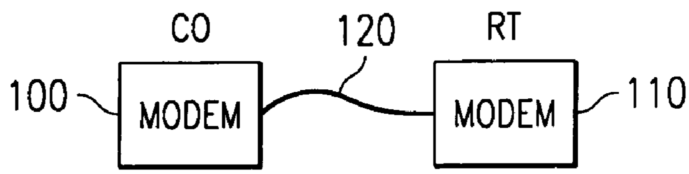
FIG. 1 illustrates a central office modem and a remote terminal modem connected together via a transmission line.

A modem allows a remote user through the use of a computer or a computer network to connect to another computer or computer network via a connection that is normally not part of a computer network, such as a telephone line, a coaxial video cable, or a power line. Generally, the modems permit users to connect to a remote network over a transmission line (for example, the telephone line) that does not usually function as a network connection (a telephone line normally carries voice). Refer now to FIG. 1 for a diagram illustrating one commonly used connection configuration. A first modem 100, located at a central office (CO), is connected to a second modem 110 that is located remotely. The second modem 110 is commonly referred to as being a remote terminal (RT). Connecting the two modems is a transmission line 120. While FIG. 1 displays the transmission line 120 as a physical connection, such as a twisted-pair, a coaxial cable, a power cable, or an optical cable, there is no requirement on the transmission line 120 being a cable or wire at all. The transmission line 120 may, in fact, be a wireless connection between the two modems. The wireless connection may use radio frequency (RF) signals, infrared signals, microwave signals, cellular signals, or any other medium capable of transmitting information. Since the transmission line 120 may, in fact, not be a physical line, it is commonly referred to as a communications channel.

Figure 2:
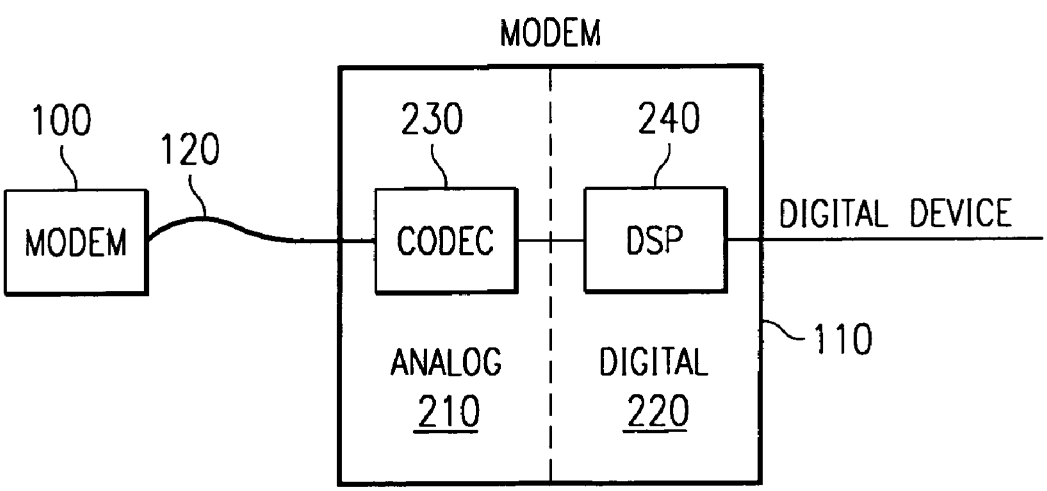
FIG. 2 is a diagram providing a more detailed view of a modem according to a preferred embodiment of the present invention.

In a never-ending drive to provide greater data-rates, more advanced and complex signaling methods are being used. As signaling methods become more complex, additional signal processing is required to maximize utilization of available bandwidth. Typical signal processing operations in data communications include signal filtering and channel equalization. Both signal filtering and channel equalization can occur on either analog or digital signals. In many modems, signal processing is performed on both analog and digital signals. Refer now to FIG. 2 for a diagram illustrating in greater detail a modern high data-rate modem. A modem has two data paths, a receive path and a transmit path. The transmit path is responsible for sending data to another modem at the other end of the transmission line, while the receive path accepts data sent from the other modem. Because transmit performance is primarily dependent on the other modem, which is normally out of the control of the sending modem, optimizations of the transmit path may not result in a corresponding increase in performance. Therefore, the majority of optimizations involve improving the receive path performance.

The modem 110 can be partitioned into two portions, an analog portion 210 and a digital portion 220. Analog signals arrive at the modem 110 via the transmission line 120 where a codec 230 performs analog signal processing on the analog signal and digitizes the analog signal. The digital signal is then processed by a digital signal processor (DSP) 240 and at the output, a stream of digital user data is provided to some digital device connected to the modem 110. An example of a codec 230 would be a Texas Instruments TLFD600 while an exemplary DSP would be a Texas Instruments TMS320C6200. While FIG. 2 provides an enhanced view of the modem 110 that is the remote side of the transmission line 120, a similar diagram could be used to provide an enhanced view of the modem 100 that is at the host side of the transmission line 120.

Figure 3:
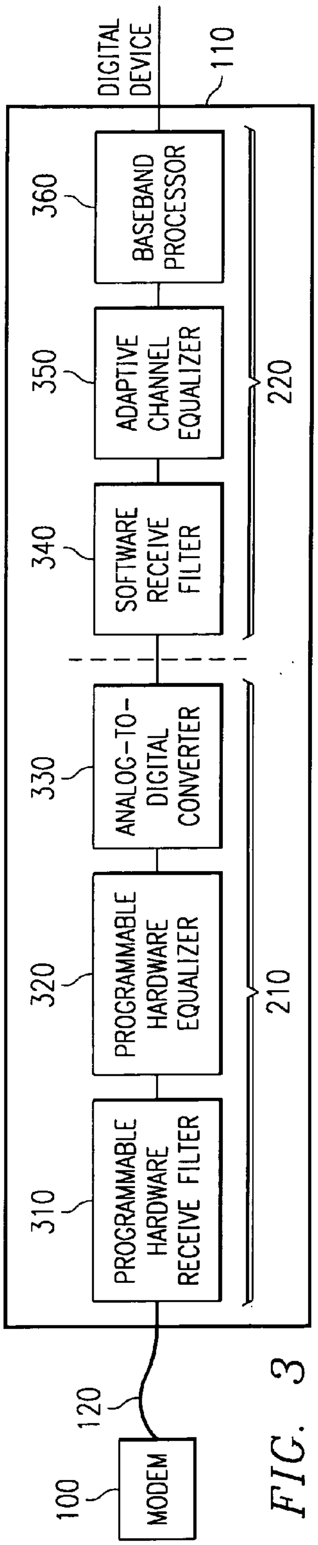
FIG. 3 is a diagram providing an even more detailed view of a modem according to a preferred embodiment of the present invention.

Refer now to FIG. 3 for a diagram providing greater details of the receive path of the modem 110. Such a modem may be used in an Asymmetric Digital Subscriber Line (ADSL) application. ADSL uses standard telephone twisted-pair lines to provide data-rates of greater than 6 megabits per second. ADSL is a digital data connection and transmission technology using Discrete Multi-tone (DMT) and is used in these specifications to facilitate discussion of the present invention. DMT is a multi-carrier transmission technique in which the entire frequency band is partitioned into a number of subchannels, with each subchannel used to transmit a portion of the data. In ADSL, the frequency band is partitioned into 250 separate 4.3125 kHz wide subchannels, starting at 25.875 kHz to 1.104 MHz for downstream transmission (communications to the user) and 26 subchannels from 25.875 kHz to 138 kHz for upstream transmission (communications from the user). ADSL and DMT are not the only technologies with which the present invention is applicable and the use of ADSL and DMT in the discussion should not be construed as to limit this invention's application.

The analog portion 210 of the modem 110 is shown to comprise three functions or components: a programmable hardware receive filter 310, a programmable hardware equalizer 320, and an analog-to-digital converter (ADC) 330. Various components such as line drivers, amplifiers, etc. are not displayed in order to maintain simplicity, but are part of the analog portion 210 of the modem 110. The ADC 330 digitizes the analog signal into a digital signal, taking as input an analog signal which is encoded in a manner consistent with the transmission technology used and providing as output a stream of digital bits. The function of an ADC 330 is well understood by persons of ordinary skill in the art of the present invention.

The programmable hardware receive filter 310 is used to separate the desired signal from noise and other types of interference. Interference may be from sources including, but not limited to: the local transmitter of the modem itself (echo), AM radio which occupies a significant portion of the upper frequency range of an ADSL system, other communications systems (both analog and digital) operating in close proximity to and in the same frequency range, and electromechanical appliances within the home and near the modem. The programmable hardware receive filter 310 can be programmed with a filter type (low-pass, band-pass, or high-pass), a filter order (the rapidness of the transition from pass-band to stop-band), and a corner frequency (the frequency of the beginning of the transition from pass-band to stop-band). By varying the filter parameters, noise and other types of interference may be removed from the analog signal. The programmable hardware receive filter 310 may be implemented as a single filter or it may be a cascade of simple filters which can be combined or by-passed to provide the desired filtering operation.

A channel's frequency response tends to attenuate as the frequency increases. The programmable hardware equalizer 320 flattens a channel's frequency response by imparting an increasing amount of gain corresponding to the increasing frequency. The signal that is attenuated by the channel is amplified by the programmable hardware equalizer 320, resulting in a signal with a relatively constant magnitude as a function of frequency. Ideally, the frequency response of the programmable hardware equalizer 320 would be the multiplicative inverse of the channel's frequency response, which would completely flatten the channel's frequency response. A relatively simple programmable hardware equalizer can be programmed with a simple slope of a straight line representing the increase in the gain as a function of frequency, while a more complex programmable hardware equalizer may use a more complex approximation of the actual channel's frequency response, such as higher order curves and lines, to perform a better job of flattening the channel's frequency response.

After the analog portion 210 of the modem 110 completes signal processing and digitizing the signal, the signal moves to the digital portion 220 of the modem 110. The digital portion 220 of the modem 110 is shown to comprise three functions or components: a software receive filter 340, an adaptive channel equalizer 350, and a baseband processor 360. The baseband processor 360 performs operations such as demodulation of the digital signal and error detection and correction on the data. The output of the baseband processor 360 is user data that is usable by the digital device connected to the modem 110.

In a preferred embodiment of the present invention, the software receive filter 340 is a program executing on a dedicated DSP. However, the software receive filter 340 may be running on a general purpose microprocessor or be implemented in firmware on a custom hardware integrated circuit. Being a software filter, the software receive filter 340 is fully customizable as to its type, order, and corner frequency. Compare this to the programmable hardware receive filter 310 which permits limited variability in its parameters due to the fact that the programmable hardware receive filter 310 is implemented in actual hardware (using components such as capacitors and resistors), therefore limiting its flexibility.

Due to the flexibility of the software receive filter 340, it is used mainly to mitigate a widely known phenomenon commonly referred to as Fast Fourier Transform (FFT) spreading. In DMT, an FFT is used to convert a time domain signal into a frequency domain signal (demodulation). The time domain signal is a discrete form of the analog signal being transmitted over the transmission line 120. The frequency domain signal is the form of the signal used to extract (insert) user data from (into) the signal. FFT spreading occurs when there is an interfering signal (commonly "narrow-band") superimposed onto the desired signal (for example, as a result of AM radio interference) and the frequency content of the interfering signal does not exactly match up with one of the discrete frequencies represented by the FFT. FFT spreading may also occur as a result of an abrupt (discontinuous) transition from one data frame to the next as in the case of the received echo signal. When such interference exists on the signal and an FFT is performed, the interference is spread out across a large frequency band and a large number of subchannels. As stated previously, the high level of flexibility in the software receive filter 340 permits the easy mitigation of such interfering signals before they become a major problem.

Like the software receive filter 340, the adaptive channel equalizer 350 has a significant advantage in flexibility over its hardware equivalent, the programmable hardware equalizer 320. The main function of the adaptive channel equalizer 350 is to shorten or equalize the residual channel response. Since it is implemented in software, the adaptive channel equalizer 350 is not limited to flattening the channel's frequency response by using a linearly increasing gain. Instead, adaptive channel equalizers are specified by a series of coefficients that specify a high order approximation of the gain curve required to equalize the channel response.

Each of the four signal processing components discussed above can have an impact on the overall channel response dependent upon the individual signal processing component's parameters. Modifying a component's parameters without regard to its effect on the overall channel response may result in a system performance that may be sub-optimal. For example, the programmable hardware receive filter 310 used for filtering also affects the overall channel response which in turn affects the performance of the adaptive channel equalizer 350.

To optimally select the best possible combination of modem parameters, two quantities are generally determined (either calculated or estimated): the modem receive noise floor (including echo energy, crosstalk noise, thermal noise, etc.) and the receive signal power, and indirectly, the channel response. In a preferred embodiment of the present invention, these quantities are estimated and are used for modem parameter selection during the initialization period (training period) of the modem. At modem power-up or during the establishment of a connection between two modems, the modem undergoes what is known as a training period. During the training period, the two modems transmit a pre-specified sequence of test tones and signals to each other. The received signals and sequences are used to help characterize the transmission line and to configure the modems. The test tones and signals can also be used to provide information required in the estimation of the channel's receive noise floor, the receive signal power, and the channel response.

Figure 4:
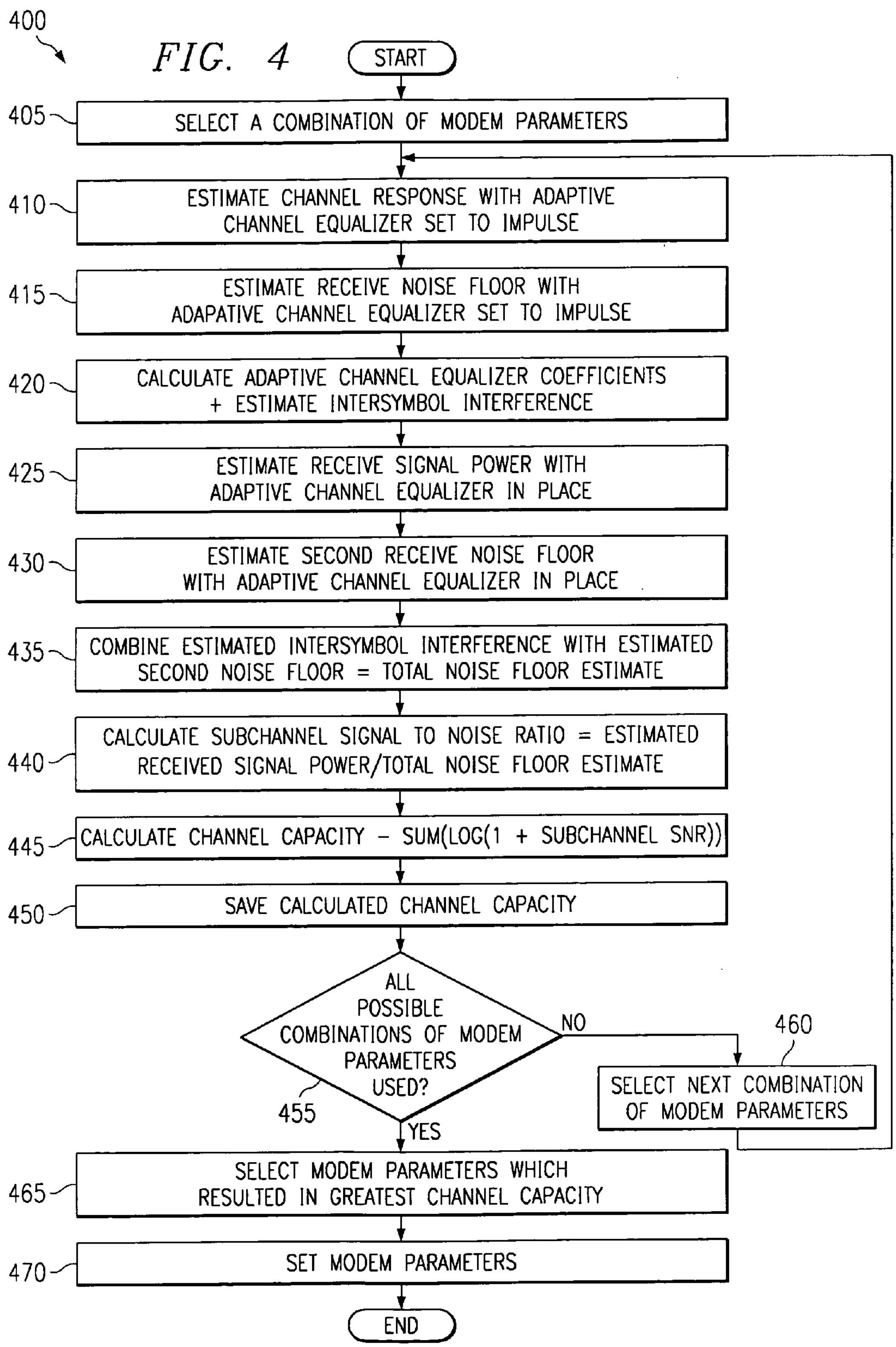
FIG. 4 is a flow diagram illustrating a modem parameter selection algorithm according to a preferred embodiment of the present invention.

Refer now to FIG. 4 for a flow diagram illustrating a modem parameter selection algorithm 400 according to a preferred embodiment of the present invention. According to a preferred embodiment of the present invention, the selection of the modem parameters is not based solely on a single measurement of the characteristics of the transmission line. Rather, it is an iterative process involving the setting of the modem parameters and then estimating the overall channel capacity and then changing the modem parameters and estimating the overall channel capacity again. This iterative process is repeated until all modem parameters have been selected and overall system performance measured.

The algorithm 400 begins in block 405 by selecting an initial combination of modem parameters, one complete set for each of the signal processing components in the modem 110. For the modem 110 displayed in FIG. 3, the algorithm 400 would select the following modem parameters: filter type, filter order, and corner frequency for the programmable hardware receive filter 310; equalizer slope for the programmable hardware equalizer 320; filter type, filter order, and corner frequency for the software receive filter 340; and an impulse (no equalization) for the adaptive channel equalizer 350. The adaptive channel equalizer 350 is initially set to perform no equalization to permit accurate estimation of several channel characteristics by reducing the total number of sources of influence on the channel's frequency response.

With the initial combination of modem parameters selected, the algorithm 400 estimates the quantities (the channel's receive noise floor, the receive signal power, and the channel response) needed to calculate the overall channel capacity. The algorithm 400 begins by estimating the channel response with the adaptive channel equalizer 350 set to perform no equalization (block 410). The adaptive channel equalizer 350 is set to perform no equalization to reduce the number of sources of influence on the overall channel frequency response and because of the large number of equalizer coefficients usually associated with the adaptive channel equalizer 350 it would be highly unlikely to arbitrarily select a set of equalizer coefficients that would result in optimal performance.

According to a preferred embodiment of the present invention the channel response is calculated from the data used to estimate the receive signal power. To estimate the received signal power, a random/pseudorandom signal or a periodic signal is transmitted. It is preferred to use a periodic signal since it simplifies the estimates. At the receive end, the received signal is averaged over several periods, transformed to frequency domain (using for example the FFT) and then squared to obtain the estimated received signal power. If a random/pseudo-random signal is used, the received signal may be decorrelated by multiplying the received signal with the transmitted signal prior to averaging and transformation to frequency domain. The transformed signal is then squared and divided by the square of the transform of the transmitted signal, giving the estimated received signal power. Because the transmit signal is known, in the periodic signal case the channel response estimate is obtained by dividing the transformed average received signal by the transformed transmitted signal. For the random/pseudo-random signal case, the transformed decorrelated received signal is divided by the square of the transformed transmitted signal to obtain the channel response estimate.

After estimating the channel response, the algorithm 400 estimates the receive noise floor with the adaptive channel equalizer 350 also set to perform no equalization (block 415). To estimate the receive noise floor, the algorithm 400 simply measures the receive signal when there are no signals being transmitted and averages the received power (square of the FFT of the received signal) over a period of time. Another method to estimate the receive noise floor when there is a transmit signal present is to first estimate the received power (as indicated above) and then subtract out an estimate of the received signal power (obtained as mentioned above).

After estimating the channel response and the receive noise floor, the algorithm calculates the equalizer coefficients for the adaptive channel equalizer 350 (block 420). The calculation of the equalizer coefficients uses the estimates for channel response and receive noise floor calculated in blocks 410 and 415. The calculation of the equalizer coefficients is based on some design criteria specified by the system designer. Exemplary equalizer design methods can be found in many technical papers, examples of which include: Al-Dhahir et al., "Optimum Finite Length Equalization for Multicarrier Transceivers", *IEEE Transactions on Communications*, Vol. 44, No. 1 (Jan. 1996), pp. 56–64 and Farhang-Boroujeny and Ding, "Design Methods for Time-Domain Equalizers in DMT Transceivers", *IEEE Transactions on Communications*, Vol. 49, No. 3 (Mar. 2001), pp. 554–562.

In addition to calculating the equalizer coefficients, the algorithm 400 estimates the inter-symbol interference spectral energy due to the unequalized channel. Inter-symbol interference is interference between data symbols that occurs when the channel response length is greater than a guard band between the two data symbols. For example, in ADSL systems a cyclic prefix is used with each transmitted data symbol. The cyclic prefix is a circular extension of the data symbol created by prepending the last few samples of the data symbol to the front of the data symbol. If the effective channel response length is shorter than the length of the cyclic prefix the output of the channel appears to be a circular convolution of the input with the channel. Hence, no inter-symbol interference distortion is present. However, in many communication systems there may not be any guard band present. Therefore, unless the channel equalizer shortens the channel to one sample in length (an ideal channel equalizer), inter-symbol interference will always be present in the received signal. Methods for estimating the inter-symbol interference spectral noise are well-known and are easily implemented by persons of ordinary skill in the art of the present invention.

The algorithm 400 continues by estimating the receive signal power with the adaptive channel equalizer 350 configured to operate according to the equalizer coefficients calculated in block 420 (block 425; the receive signal power is estimated as indicated above). Further, the algorithm 400 re-estimates the received noise floor with the adaptive channel equalizer 350 configured to operate according to the equalizer coefficients calculated in block 420 (block 430; the receive noise floor is estimated as indicated above). The purpose of re-estimating the received noise floor is to take into account the effect of the adaptive channel equalizer 350 on the noise floor.

A total noise floor estimate is calculated by combining the estimated inter-symbol interference spectral noise with the re-estimated receive noise floor (block 435). The total noise floor estimate is one of the quantities required to calculate the channel capacity (for the current combination of modem parameters), the other being the estimated receive signal power.

The estimated receive signal power divided by the total noise floor estimate is the calculated subchannel signal-to-noise ratio (block 440: $\text{subchannel}_{SNR}$). In an ADSL system, the total available bandwidth is divided into multiple subchannels with each subchannel being capable of carrying a different amount of data depending on its own signal-to-noise ratio. Since each subchannel is capable of carrying a different amount of data, the channel capacity (according to the well known Shannon channel capacity formula) is calculated by summing the logarithm of each $\text{subchannel}_{SNR}$, that is expressible as $\Sigma\text{Log}_2(1+\text{subchannel}_{SNR})$, with the summation being performed for all subchannels (block 445). Other communications systems using different data transmission technologies would use a different set of calculations to determine the channel capacity, but the overall process remains the same. The combination of modem parameters and the resulting channel capacity are saved in memory (block 450).

After saving the modem parameters and channel capacity to memory, the algorithm 400 checks if every possible combination of modem parameters have been used in calculating the channel capacity block 455). If every possible combination has not been used, the algorithm 400 selects another combination of modem parameters and repeats all calculations to get the channel capacity estimate for that particular combination of modem parameters (block 460).

If every possible combination of modem parameters has been evaluated, then the algorithm 400 selects the combination of modem parameters that resulted in the greatest channel capacity and sets the parameters of the signal processing components accordingly (blocks 465, 470). Alternatively, a subset of every possible combination of modem parameters may be used for the search. The subset may be chosen based on certain criteria, an example of which is discussed later, or the subset may be randomly chosen.

Figure 5:
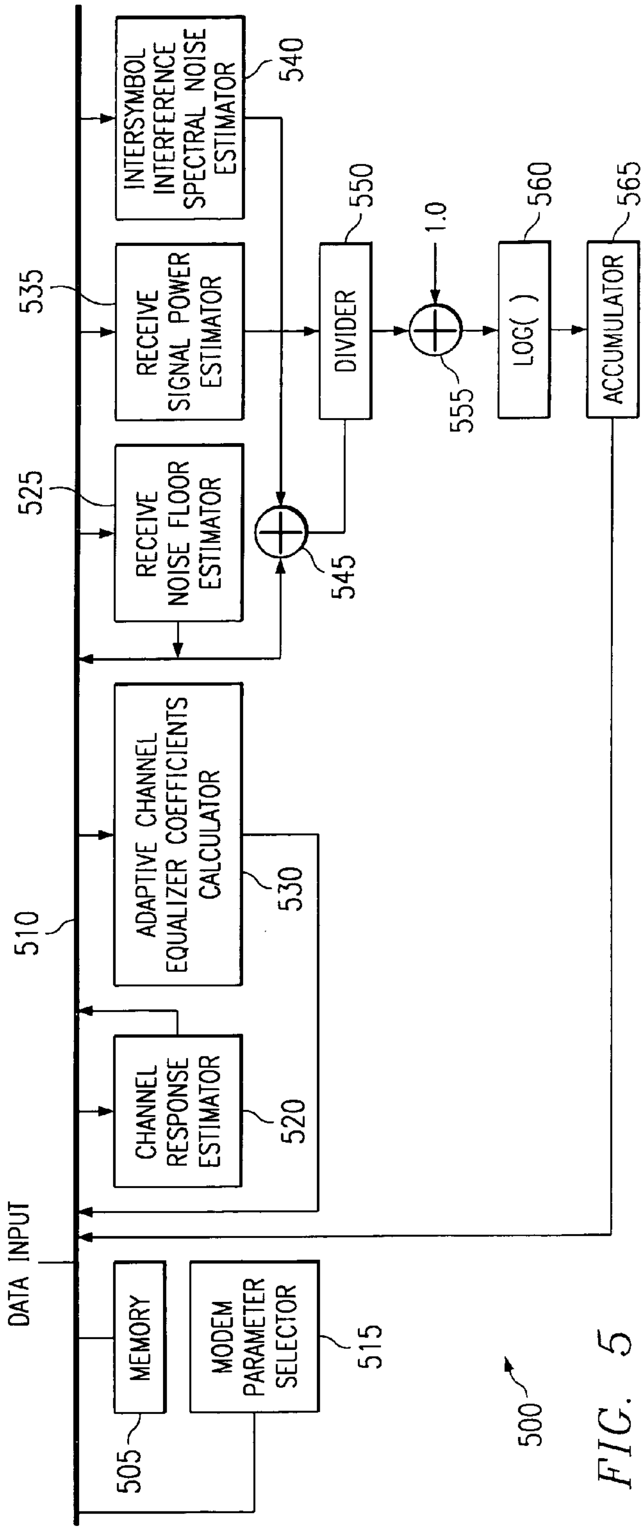
FIG. 5 is a block diagram illustrating the functional blocks of an apparatus for improving receive path performance.

Refer now to FIG. 5 for a block diagram illustrating the functional components of an apparatus 500 for improving the performance of a modem receive path according to a preferred embodiment of the present invention. The apparatus 500 comprises a memory 505 for storing, amongst other values, the various combinations of modem parameters and their resulting channel capacities. Central to the apparatus 500 is a communications interface 510 that permits sharing of data between the various components of the apparatus 500. The communications interface 510 permits sharing of data between devices coupled to it.

In a preferred embodiment of the present invention, a modem parameter selector 515 is connected to the communications interface 510. The modem parameter selector 515 selects combinations of modem parameters and provides them to the memory 505 and the various apparatus components via the communications interface 510. In an alternative embodiment, the modem parameter selector 515 is connected to the memory 505 and provides the selected modem parameters directly to the memory 505, which in turn provides them to the various apparatus components.

According to another preferred embodiment of the present invention, the various components in the apparatus are connected to each other via a direct physical connection and not through a communications interface 510.

A data input, coupled to the communications interface 510, provides the received signal to the various apparatus components. In a preferred embodiment of the present invention, the data input provides a digital bitstream, which generally allows the apparatus 500 to perform estimates on various characteristics of the channel with each signal processing component in place, including the adaptive channel equalizer 350. In order to do so, the apparatus 500 may have access to the received signal at the output of the final signal processing element. In a preferred embodiment of the present invention, the final signal processing element is the adaptive channel equalizer 350. Since the adaptive channel equalizer 350 is a digital device, the final signal is also in digital form.

The data input, via the communications interface 510, provides the digital signal to a channel response estimator 520, a receive noise floor estimator 525, an adaptive channel equalizer coefficients calculator 530, a receive signal power estimator 535, and an inter-symbol interference spectral noise estimator 540. The channel response estimator 520 estimates the channel response of the channel as a function of frequency for the transmission line 120 plus the receive path of the modem 110 up to the adaptive channel equalizer 350. The channel response estimator 520 performs the work performed in block 410 of FIG. 4. The receive noise floor estimator 525 estimates the noise floor of the transmission line 120 plus the receive path of the modem 110. For each combination of modem parameters, the receive noise floor estimator 525 performs two noise floor estimates: a first noise floor estimate with the adaptive channel equalizer 350 set to perform no equalization (the adaptive channel equalizer is set to an impulse) and then a second noise floor estimate with the adaptive channel equalizer set according to its calculated coefficients.

The output of the channel response estimator 520 and the output of the receive noise floor estimator 525 with the adaptive channel equalizer 350 set to an impulse are used by an adaptive channel equalizer coefficients calculator 530. The adaptive channel equalizer coefficients calculator 530 uses these two estimated values to calculate the coefficients of the adaptive channel equalizer 350. The coefficients are calculated according to some design criteria as specified by the modem's designers and are used to configure the adaptive channel equalizer 350. According to another preferred embodiment of the present invention, the adaptive channel equalizer coefficients calculator 530 can use the digital signal from the data input to calculate the coefficients for the adaptive channel equalizer 350.

The data input also provides the digital signal to the receive signal power estimator 535, which estimates the received signal power, and the inter-symbol interference spectral noise estimator 540 which estimates the noise contribution based upon inter-symbol interference. The inter-symbol interference spectral noise estimator 540 can alternatively estimate the intersymbol interference spectral noise from the estimated channel response and the calculated adaptive channel equalizer coefficients. The estimated inter-symbol interference spectral noise and the noise floor estimate with the adaptive channel equalizer set according to its calculated coefficients are combined (adder 545) to produce a total noise floor estimate. The estimated signal power is divided by the total noise floor estimate (divider 550) to produce a calculated subchannel signal-to-noise ratio.

In a preferred embodiment of the present invention, the calculated subchannel signal-to-noise ratio is converted to channel capacity (a single number that represents modem performance for the current combination of modem parameters) according to the well-known Shannon channel capacity formula. A constant value of 1.0 is added to the subchannel signal-to-noise ratios, the logarithm is then calculated and combined with the logarithm for each of the other subchannels (accumulator 565). The final result is the channel capacity for the particular combination of modem parameters.

In another preferred embodiment of the present invention, an initial set of modem parameters may be selected independently of each other, i.e., the modem parameter selection technique commonly used today. After independently selecting the initial set of modem parameters, the channel capacity is calculated using a single iteration of the algorithm 400 displayed in FIG. 4. Unlike the algorithm 400 displayed in FIG. 4, the next set of modem parameters is not arbitrarily chosen. Instead, the next set of modem parameters are generally chosen within some selected threshold away from the initial set of modem parameters. For example, in the initial set of modem parameters, if the programmable hardware receive filter 310 was initially selected to be a third order high-pass filter, then according to a preferred embodiment of the present invention, the possible new values for the order of Is the high-pass filter would be the next higher order (fourth order) and the next lower order (second order). An exemplary set of possible values for each modem parameter are 1) the initially selected value and 2) the next value larger than the selected value and 3) the next value smaller than the selected value. According to another preferred embodiment of the present invention, the threshold may be relaxed to increase the set of possible modem parameters.

In another preferred embodiment of the present invention, the search space for the optimal set of modem parameters is limited by the type of noise and interference experienced by the modem. For example, if the type of interference and noise requires that the programmable hardware receive filter 310 be configured as a low-pass filter, it would be an inefficient use of time to calculate overall channel capacity for the cases when the programmable hardware receive filter are configured as band-pass and high-pass filters. By using the estimate of interference and noise as a guide, the total number of modem parameters needing to be searched can be reduced significantly.

In yet another preferred embodiment of the present invention, the channel response is estimated once with the adaptive channel equalizer 350 set to perform no equalization (block 410 of FIG. 4) and is performed prior to selecting the initial combination of modem parameters (i.e., bypassing the signal processing components to be set). After the first channel response estimate, changes in any of the modem parameters can be reflected by performing a convolution of the initial channel response estimate with the response of the particular signal processing component with the new parameter setting. For example, if the initial channel response estimate was “h” and the programmable hardware receive filter 310 was modified to have a response “f”, then the overall response would be the convolution of “h” with “f”. Because the modem parameters are known a priori, the effect of the different signal processing components can be pre-calculated and stored. Hence, the effects of the modem parameters to the channel capacity can be rapidly calculated instead of calculated and estimated.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A digital communications system with a built-in apparatus for improving receive path performance in the presence of noise, comprising:

an analog input, adapted to providing an analog datastream;

a hardware receive filter, having an input coupled to the analog input and an output coupled to a hardware equalizer, adapted to filtering the analog datastream and rejecting signals lying outside a frequency spectrum of interest;

the hardware equalizer, having an input coupled to the hardware receive filter and an output coupled to an analog-to-digital converter, adapted to making the channel response of a communications channel flat as function of frequency;

the analog-to-digital converter, having an input coupled to the hardware equalizer and an output coupled to a software receive filter, adapted to digitizing the analog datastream into a digital bitstream;

the software receive filter, having an input coupled to the analog-to-digital converter and an output coupled to an adaptive channel equalizer, adapted to further filter desired data signal from undesired noise;

the adaptive channel equalizer, having an input coupled to the software receive filter and an output coupled to a baseband processor, adapted to equalizing the channel response of a communications channel;

the baseband processor, having an input coupled to the adaptive channel equalizer and an output coupled to a digital device, adapted to demodulating and error detection and correction on the digital bitstream;

the apparatus, having a data input coupled to the adaptive channel equalizer and an output coupled to the hardware receive filter and the hardware equalizer and the software receive filter and the adaptive channel equalizer, adapted to optimally setting the signal processing modem parameters for improving the receive path performance, wherein the apparatus further comprising:

a memory, adapted to storing digital data;

an estimator unit, having a first input coupled to the memory and a second input coupled to the data input, and an output coupled to a compute unit, the estimator unit is adapted to providing estimates of signal power, channel noise and channel response; and the compute unit, having an input coupled the estimator unit and the compute unit having an output coupled to the memory, adapted to computing a channel capacity based the selected combination of modem parameters.

2. The digital communications system of claim 1, wherein the compute unit comprises:

a first adder, having a first input coupled to a receive noise floor estimator and a second input coupled to an inter-symbol interference estimator and an output coupled to a divider, adapted to adding the two inputs;

the divider, having a first input coupled to the receive signal power estimator and a second input coupled to the first adder and an output coupled to a second adder, adapted to dividing the output of the receive signal power calculator with the output of first adder;

the second adder, having a first input coupled to the divider and a second input coupled to a constant value of 1.0 and an output coupled to a logarithm calculator, adapted to adding the two inputs;

the logarithm calculator, having an input coupled to the second adder and an output coupled to an accumulator, adapted to calculating the logarithm of the input; and the accumulator, having a first input coupled to the logarithm calculator and an output coupled to the memory, adapted to summing the input.

3. The apparatus of claim 1, wherein the estimator unit comprises:

a modem parameter selector, coupled to the memory, adapted to selecting a combination of modem parameters from a set of modem parameters;

a channel response estimator adapted to calculating the receive path's channel response, having an input coupled to the data input and an output coupled to an adaptive channel equalizer coefficients calculator and the output coupled to an inter-symbol interference estimator;

a receive noise floor estimator, having an input coupled to the data input and an output coupled to adaptive channel equalizer coefficients calculator and the output coupled to a compute unit, adapted to calculating the receive path's total noise floor;

the adaptive channel equalizer coefficients calculator, having an input coupled to the channel response estimator and a second input coupled to the receive noise floor estimator and an output coupled to the memory, adapted to calculating a set of adaptive channel equalizer coefficients;

a receive signal power estimator, having an input coupled to the data input and an output coupled to the compute unit, adapted to calculating the signal power of the digital bitstream from the data input; and an inter-symbol interference estimator, having an input coupled to the data input and an output coupled to the compute unit, adapted to calculating inter-symbol interference spectral power in the digital bitstream from the data input.

4. An apparatus of claim 3, wherein the adaptive channel equalizer coefficients calculator has an input coupled to the data input and the output coupled to the memory.

5. An apparatus of claim 3, wherein the inter-symbol interference estimator has an input coupled to the channel response estimator and a second input coupled to the adaptive channel equalizer coefficients calculator and the output coupled to the compute unit.

6. An apparatus of claim 3, wherein the modem parameters are selected from the group consisting of: filter type, filter order, corner frequency, equalizer slope, equalizer coefficients, and combinations thereof.

* * * * *